July 28, 1970 F. BROUWER 3,522,375

FACSIMILE CARRIER OSCILLATOR CIRCUIT INCLUDING MEANS FOR SYNCHRONIZING THE CARRIER WITH RESPECT TO THE SCANNER

Filed July 28, 1967

INVENTOR

Frans Brouwer

United States Patent Office 3,522,375

Patented July 28, 1970

3,522,375
FACSIMILE CARRIER OSCILLATOR CIRCUIT INCLUDING MEANS FOR SYNCHRONIZING THE CARRIER WITH RESPECT TO THE SCANNER

Frans Brouwer, Glencoe, Ill., assignor to Stewart-Warner Corporation, Chicago, Ill., a corporation of Virginia Filed July 28, 1967, Ser. No. 656,777
Int. Cl. H04n *1/02*
U.S. Cl. 178—69.5 10 Claims

ABSTRACT OF THE DISCLOSURE

A circuit for improving the facsimile reproduction of copy documents wherein a free running frequency signal oscillator providing the modulation carrier is synchronized in time and phase relationship with the copy scanner between each scanning segment by stopping and restarting the oscillations with each synchronizing pulse to eliminate certain distortions in the reproduced copy including the roping effects of vertical lines.

In one type of facsimile system graphic copy is scanned line by line with suitable optical means and light reflected therefrom is focused on a photocell or phototube to generate electrical signals corresponding to the intensity of light. The electric signals are caused to modulate a generated carrier signal in a modulator. The modulated carrier is then directly transmitted by wire to a receiver or is caused to further modulate a radio frequency carrier in a radio transmitter for electromagnetic transmission. The electrical signals received at a remote location are caused to reproduce the graphic copy on a recording medium such as an electrolytically markable paper.

Figure 1:
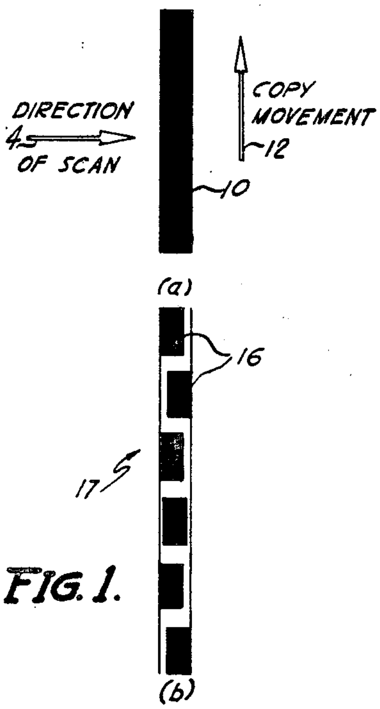
Figure 2:
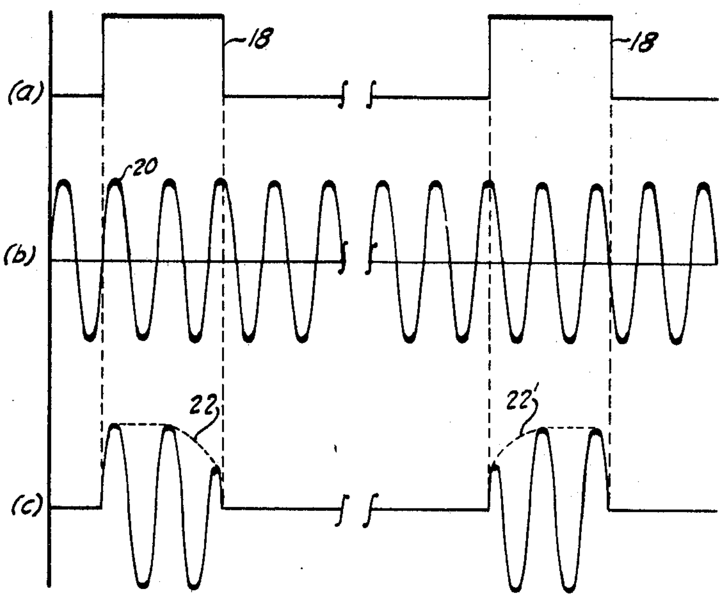

It has been found that certain distortions appeared in the reproduced copy from a facsimile system of the type in which the video signal generated by the copy scanner is caused to modulate a low frequency carrier signal. For a better understanding of the problem involved reference is made to FIGS. 1 and 2 in this introductory paragraph, FIGS. 3 and 4 being referred to and described in detail later in the specification.

FIG. 1*a* shows an enlarged view of a line 10 on a document to be reproduced with the direction of the copy movement and the direction of scan across the line being indicated by the arrows 12 and 14, respectively. Each time the copy scanner crosses the line 10 in the transverse direction a segment of the line is viewed and a corresponding electric signal is generated for transmission to the marking device in the facsimile receiver. Thus, the reproduced line 17 at the receiver is made up of individual segments each produced by a separate scan of the document recorder, the composite of which makes up the image of the line. It can be seen in the FIG. 1*b* that unless each of the segments 16 is properly aligned, a slight distortion of the image of the line is produced in the form of a waving or "roping" effect.

It has been found that the "roping" effect is caused by improper synchronization of the carrier frequency signal with respect to the scanning cycle. This may be seen in FIG. 2 in which waveform *a* represents the idealized pulse 18 which is generated each time the copy scanner encounters the line 10. Waveform *b* represents the low frequency carrier signal 20 to be modulated by the pulses 18. It can be seen in waveform *c* that differences appear in the modulation envelopes 22, 22' for each succeeding modulating pulse 18, 18' if the carrier signal 20 is not properly synchronized with respect to the scanning cycle. It is these differences in the modulating envelopes, caused by the lack of synchronization between the carrier signal 20 and the scanning cycle, that produce the misalignment or "roping" of the segments 16 of the line reproduced at the receiver recording means.

In this invention the "roping" effect is eliminated by causing the oscillator producing the carrier signal to momentarily stop and then restart at a precise time between each cycle of the copy scanner. The free running oscillator is caused to cease operating and then restart responsive to a pulse generated in response to the cycling of the copy scanner. Means are provided to start the oscillations at the same time and in the same phase for each cycle of copy scanned. Previous facsimile systems of this type did not take into account this problem and hence the free running oscillator was caused to oscillate constantly. Thus, unless the frequency of the copy scanner movement and the carrier signal were absolutely stable, distortions such as the above described roping effect were usually present.

Figure 3:
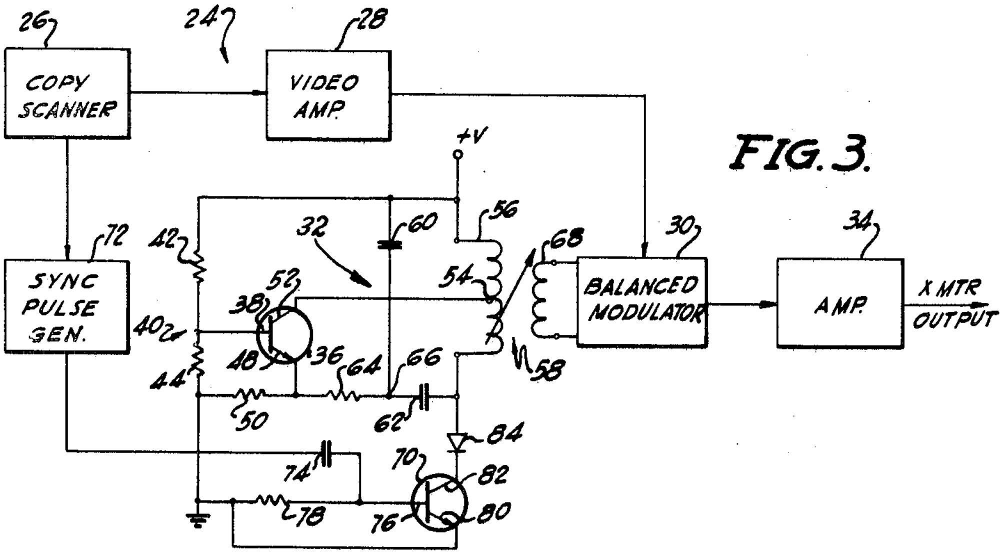
Figure 4:
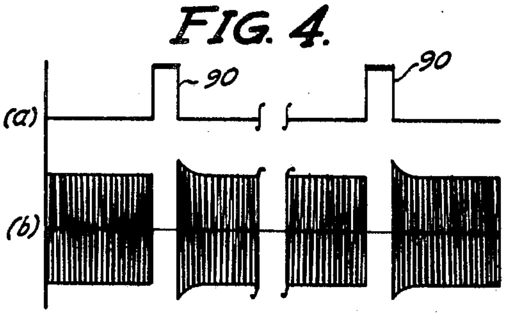

This invention might be better understood by the following detailed description especially when taken in conjunction with FIG. 3, which is a schematic diagram, partially in block form, of a facsimile transmitter with the carrier signal oscillator and synchronizing circuit shown in detailed schematic, and FIG. 4 is a representation of the synchronizing pulses and the synchronized carrier signal.

Referring first to FIG. 3, it may be seen that the facsimile transmitter 24 in this simplified version comprises a copy scanner 26 which scans the document to be reproduced in a well known manner to produce electric signals which vary in accordance with the density of the segment of copy being scanned. Electric signals are amplified in the video amplifier 28 and provided to a modulator circuit 30 of any well known type used facsimile art. The video signal is mixed in the modulator 30 with the carrier frequency signal generated by the oscillator 32 and the modulated output after being amplified by amplifier 34 is transmitted to the remotely located receiver in a well known manner.

The oscillator for producing the carrier frequency signal comprises a transistor 36 which has its base 38 forward biased by means of the voltage divider 40 formed by the series connection of resistors 42 and 44 between positive voltage and ground. The emitter 48 of transistor 36 is connected to ground through emitter resistor 50. The collector 52 of transistor 36 is connected to positive voltage through a tap 54 on the primary 56 of transformer 58. A pair of series connected capacitors 60, 62 are connected across the transformer primary 56 thus forming therewith a parallel resonant circuit. Positive feedback from the tank circuit is provided by means of resistor 64 connected between the junction 66 of the capacitors 60, 62 and the transistor-emitter 48.

The oscillator circuit as described to this point will operate as a free running oscillator at a frequency primarily determined by the values of the capacitors 60, 62 and the inductance of the transformer primary 56. The carrier signal is supplied to the balanced modulator 30 by means of the inductive coupling between the transformer primary 56 and the secondary 68. In the preferred embodiment the oscillator is designed to produce a carrier signal having the frequency of approximately 2800 cycles per second which is a common frequency used in the facsimile art.

The transistor 70 performs a switching operation for turning off and on the oscillator 32 in accordance with the cycling of the copy scanner 26. The copy scanner 26 causes a sync pulse generator 72 to produce a synchronizing pulse between each line of video copy in any well known manner such as by mechanical or electronic commutation. The sync pulses from the generator 72 are transmitted through capacitor 74 to the base 76 of transistor 70. Transistor 70 is normally cutoff in view of the ground provided to the base 76 through resistor 78 and the direct connection to ground from the emitter 80 of transistor 70. The collector 82 of transistor 70 is connected through a forward connected diode 84 to the inductance 56 such that when transistor 70 is switched into conduction by a synchronizing pulse at the base 76, the inductance 56 is series connected between the positive voltage source and ground through the forward connected diode 84 and the collector-to-emitter circuit of transistor 70.

The connection of the switching transistor 70 in the manner described serves to swamp the inductance 56 with a high current so as to render the oscillator inoperable as long as the transistor 70 is conducting. As soon as the synchronizing pulse disappears from the transistor base 76, and transistor 70 stops conducting, the oscillator 32 again resumes oscillation.

The manner in which the oscillator is disabled by means of the high swamping current through the inductance 56 has a very beneficial effect which would not be present if the oscillator were disenabled by ordinary means such as by shorting out the resonant circuit. The high current flowing through the inductance 56 causes energy to be stored by means of its magnetic flux which is available to kick the circuit into immediate oscillation as soon as the transistor 70 is turned off. The oscillations always start in the same direction because of the direction of current flow through the inductance when the oscillator is not operating. In addition the oscillations always start at full amplitude at the end of the sync pulse because of the energy stored by the inductance 56 during the oscillator disenabling period.

FIG. 4*b* portrays the carrier signal at the output of transformer 58 with the cutoff portions responsive to the sync pulses 90 shown in FIG. 4*a*.

While there has been described herein a preferred embodiment of this invention, it is to be understood that modifications and additions may be made thereto without materially deviating from the teachings herein. It is therefore intended to be limited only by the breadth of the accompanying claims.

What is claimed is:

1. In a facsimile transmitter having a copy scanner for scanning a document in a line by line manner to produce video signals responsive to the density of copy being scanned, a carrier signal generator and means for modulating said carrier signal with said video signals, the improvement wherein said carrier frequency generator comprises a free running oscillator, means operable responsive to said copy scanner for producing an electric pulse between each line of copy scan video signals and means for disabling said oscillator during each electric pulse.

2. In the facsimile transmitter of claim 1 wherein said oscillator comprises a resonant circuit and said disabling means operates to prevent said resonant circuit from resonating.

3. In the facsimile transmitter of claim 2 wherein said resonant circuit comprises an inductance and a capacitance and said disabling means comprises means for providing an overload current through said inductance responsive to said electric pulses.

4. In the facsimile transmitter of claim 1 wherein said pulse providing means also provides a synchronizing pulse for transmission between each line of video signals.

5. In the facsimile transmitter of claim 3 wherein said pulse providing means also provides a synchronizing pulse for transmission between each line of video signals.

6. In the facsimile transmitter of claim 1 wherein said oscillator comprises an amplifier, an inductance and a capacitance in resonant circuit connection providing positive feedback between the output and the input of said amplifier, a power source and switch means in series connection with said power source and said inductance operable responsive to said electric pulse for providing a swamping current through said inductance to stop said resonant circuit connected inductance and capacitance from oscillating.

7. In the facsimile transmitter of claim 6 wherein said switch comprises a transistor in series connection with said inductance and said power source.

8. In a process for producing a facsimile reproduction of a document including the steps of cyclically scanning the document in repetitive segments to produce cyclic video signals, generating a carrier frequency signal, modulating said carrier frequency signal with said video signals and transmitting the modulated carrier signal to a receiver for marking a medium in accordance with said modulating video signals, the improvement comprising the steps of momentarily stopping the generation of the carrier frequency signal between each scanning cycle and restarting said carrier signal at a precise time with respect to said scanning cycle.

9. In the process of claim 8 wherein the carrier frequency signal restarts in the same phase for each scanning cycle.

10. In the process of claim 9 wherein the carrier signal restarts at full amplitude between each scanning cycle.

References Cited

UNITED STATES PATENTS

| | | | |
|---|---|---|---|
| 2,495,115 | 1/1950 | Mayer | 178—69.5 XR |
| 3,010,073 | 11/1961 | Melas | 178—69.5 XR |

ROBERT L. GRIFFIN, Primary Examiner

R. MURRAY, Assistant Examiner

U.S. Cl. X.R.

178—6